(12) United States Patent
Ramesh et al.

(10) Patent No.: US 10,713,255 B2
(45) Date of Patent: Jul. 14, 2020

(54) SPOOL FILE FOR OPTIMIZING HASH JOIN OPERATIONS IN A RELATIONAL DATABASE SYSTEM

(71) Applicant: Teradata US, Inc., Dayton, OH (US)

(72) Inventors: Bhashyam Ramesh, Secunderabad (IN); Venkata Ramana Jyothula, Hyderabad (IN); Muthukumaran Raveendiran, Hyderabad (IN); Jaya Saxena, Hyderabad (IN); Michael Warren Watzke, Fitchburg, WI (US)

(73) Assignee: Teradata US, Inc., San Diego, CA (US)

( * ) Notice: Subject to any disclaimer, the term of this patent is extended or adjusted under 35 U.S.C. 154(b) by 495 days.

(21) Appl. No.: 15/631,364

(22) Filed: Jun. 23, 2017

(65) Prior Publication Data

US 2018/0004809 A1 Jan. 4, 2018

Related U.S. Application Data

(60) Provisional application No. 62/354,262, filed on Jun. 24, 2016, provisional application No. 62/354,288, filed on Jun. 24, 2016.

(51) Int. Cl.
| | |
|---|---|
| *G06F 16/2455* | (2019.01) |
| *G06F 16/21* | (2019.01) |
| *G06F 16/215* | (2019.01) |
| *G06F 16/27* | (2019.01) |
| *G06F 16/28* | (2019.01) |
| *G06F 16/22* | (2019.01) |
| *G06F 16/901* | (2019.01) |
| *G06F 16/2453* | (2019.01) |

(Continued)

(52) U.S. Cl.
CPC .... *G06F 16/24552* (2019.01); *G06F 11/1435* (2013.01); *G06F 16/211* (2019.01); *G06F 16/215* (2019.01); *G06F 16/2255* (2019.01); *G06F 16/2456* (2019.01); *G06F 16/24537* (2019.01); *G06F 16/24544* (2019.01); *G06F 16/278* (2019.01); *G06F 16/284* (2019.01); *G06F 16/9014* (2019.01); *G06F 9/3887* (2013.01)

(58) Field of Classification Search
CPC .............. G06F 16/24552; G06F 16/24537
USPC .................................................. 707/714
See application file for complete search history.

(56) References Cited

U.S. PATENT DOCUMENTS

| | | | | |
|---|---|---|---|---|
| 5,666,525 A | * | 9/1997 | Ross | G06F 16/24561 |
| 5,802,357 A | * | 9/1998 | Li | G06F 16/24561 |

(Continued)

*Primary Examiner* — Kimberly L Wilson
(74) *Attorney, Agent, or Firm* — James Stover

(57) ABSTRACT

A method for spooling data for use in joining a small table with a large table in a relational database system. The method analyzes a join condition for combining records from the small and large tables, selects qualified rows from the large table, and writes the qualified rows to a spool file. The spool file includes a first partition containing hash values of all bind terms for the join condition; a second partition including a join column with a best selective bind term; and at least one additional partition including additional join columns used in bind terms. The partitions are grouped together within a container row in the spool file, and multiple container rows are written together within a super-container row in the spool file.

6 Claims, 7 Drawing Sheets

(51) Int. Cl.
*G06F 11/14* (2006.01)
*G06F 9/38* (2018.01)

(56) References Cited

U.S. PATENT DOCUMENTS

| | | | | |
|---|---|---|---|---|
| 5,983,215 | A * | 11/1999 | Ross | G06F 16/24561 |
| | | | | 707/714 |
| 8,600,994 | B1 * | 12/2013 | Xu | G06F 16/40 |
| | | | | 707/737 |
| 2009/0281985 | A1 * | 11/2009 | Aggarwal | G06F 16/254 |
| 2015/0088856 | A1 * | 3/2015 | Hunter | G06F 16/24544 |
| | | | | 707/714 |
| 2015/0088919 | A1 * | 3/2015 | Hunter | G06F 16/24535 |
| | | | | 707/759 |

\* cited by examiner

SPOOL FILE FOR OPTIMIZING HASH JOIN OPERATIONS IN A RELATIONAL DATABASE SYSTEM

CROSS REFERENCE TO RELATED APPLICATIONS

This application claims priority under 35 U.S.C. § 119(e) to the following commonly-assigned patent applications, which are incorporated herein by reference:

Provisional Patent Application Ser. No. 62/354,262, entitled "DECIDING COLUMN PARTITIONS FOR IN-MEMORY OPTIMIZED SPOOL," filed on Jun. 24, 2016, by Bhashyam Ramesh, Sai Oavan Kumar Pakala, Jaiprakash G. Chimanchode, Venketa Ramana Jyothula, Muthukumaran, Jaya Saxena, and Michael Warren Watzke; and Provisional Patent Application Ser. No. 62/354,288, entitled "DATABASE IN-MEMORY HASH OPERATIONS," filed on Jun. 24, 2016, by Bhashyam Ramesh, Suresh Kumar Jami, Douglas P. Brown, Sai Pavan Pakala, Muthukumaran Raveendiran, Jaiprakash G. Chimanchode, Mohan Kumar KJ, and Ravindar Munjam.

FIELD OF THE INVENTION

The present invention relates to distributed relational database systems and in-memory processing, and more particularly, an improved spool table structure for increasing cache efficiency during join processing.

BACKGROUND OF THE INVENTION

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information. Within large corporations or organizations, a database system known as an enterprises data warehouse, may contain close to a petabyte of critical data, organized into hundreds of tables, used by many thousands of persons, performing tasks across all business or organization functions. To perform essential functions, it must operate efficiently and reliably every second of every day.

In-memory processing capabilities have recently been implemented within database systems, where data is stored and processed in CPU memory, offering much faster processing times than systems and applications limited to processing data in non-volatile or persistent storages, e.g., Hard Disk Drives (HDDs), Solid State Disk Drives (SSDs), and Flash memory.

Within relational database systems, a join operation is executed to combine records from two or more tables. A hash join is one form of join well suited to in-memory processing. In one form of hash join, the smaller table being joined is built as a hash table in CPU memory, and qualified rows from a second, or large table, are written to a spool file—a temporary file typically used to hold intermediate result data. Potential matching rows from the large table spool file are searched against the hash table.

Described below is an improved spool table structure compatible with in-memory processing for increasing cache efficiency during hash join processing.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
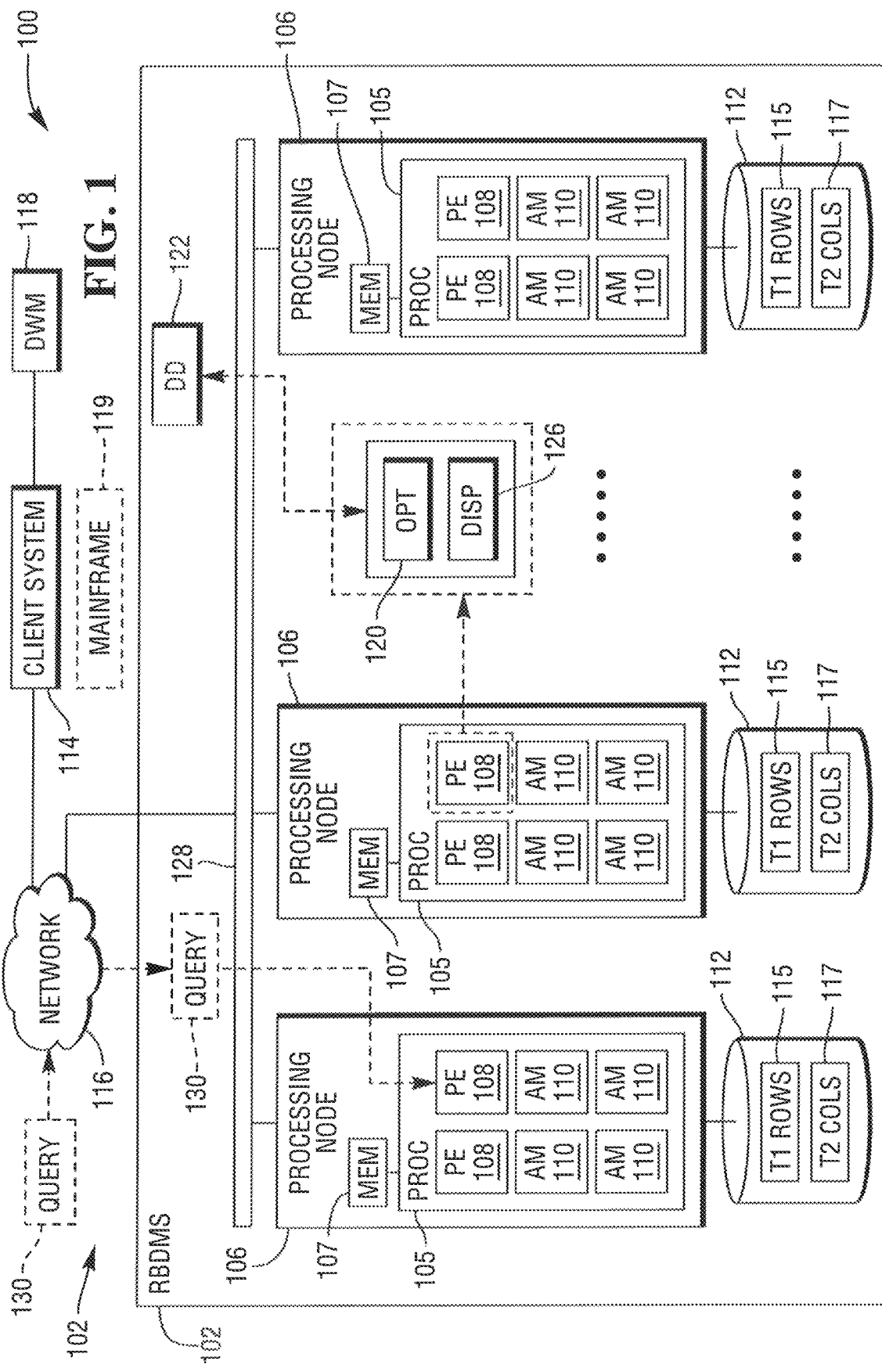
FIG. 1 is a block diagram of an example distributed relational database system.

FIG. 1 is a diagrammatic representation of an example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPS), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

Figure 2:
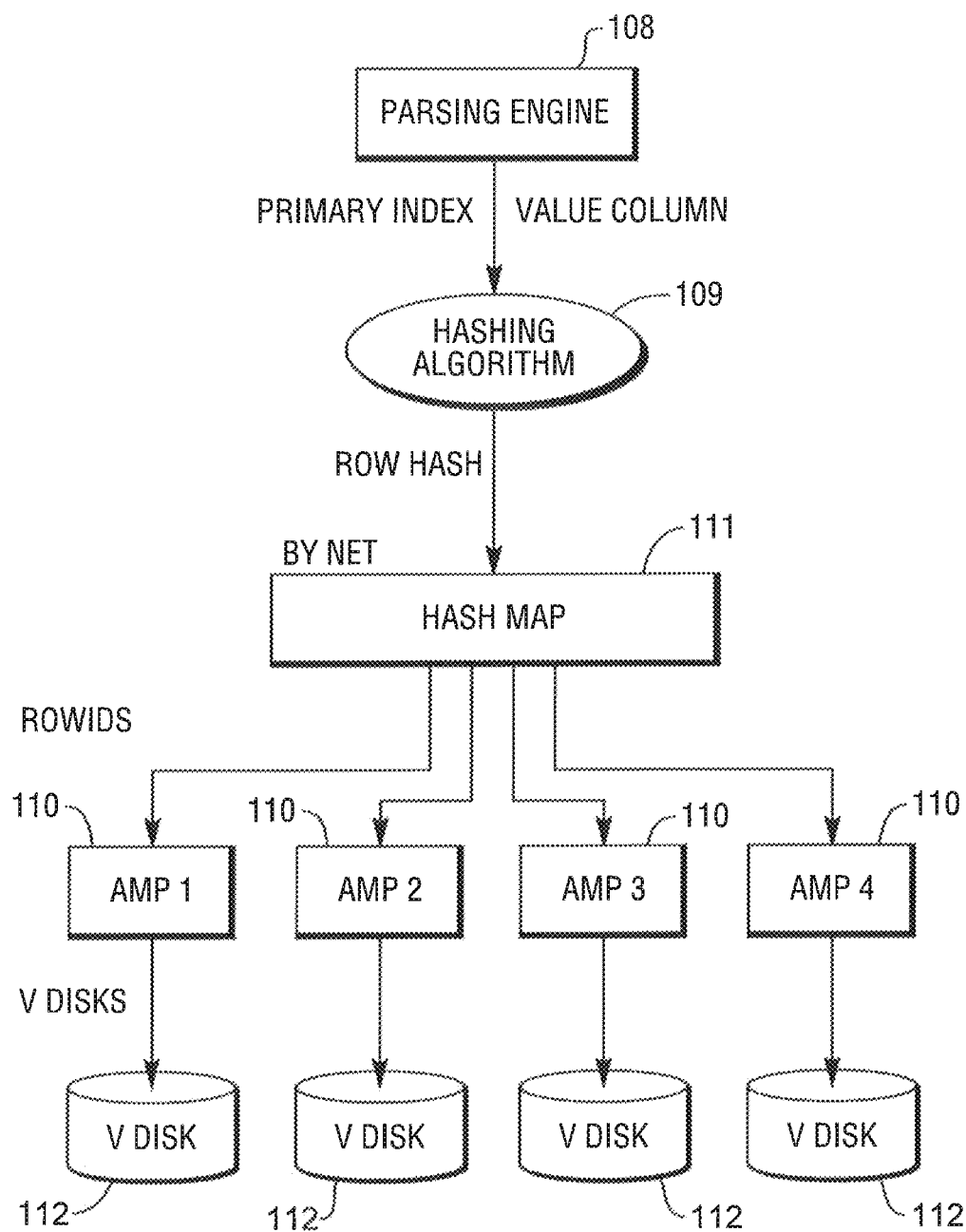
FIG. 2 provides an illustration of a hashing process for distributing records in a table across database modules.

The RBDMS 102 stores data in one or more tables in the DSFs 112. In one example, the database system 100 may be configured to distribute rows across access modules 110 and their associated DSFs 112 in accordance with their primary index. The primary index distributes the records in a table across the AMPs, by hashing the columns that make up the primary index to determine which records go to which AMP. FIG. 2 provides an illustration of this hashing process. A hashing algorithm 109 produces hash values from the values in the columns specified by the primary index. Some portion, possibly the entirety, of the hash value is designated a "hash bucket." The hash buckets are assigned to DSFs 112 and associated access modules 110 by a hash bucket map 111. The characteristics of the columns chosen for the primary index determine how evenly the rows are distributed.

For an access module 110, rows of each stored table may be stored across multiple DSFs 112, such as rows 115 to table T1 and columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 3 and 4. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 3), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Figure 3:
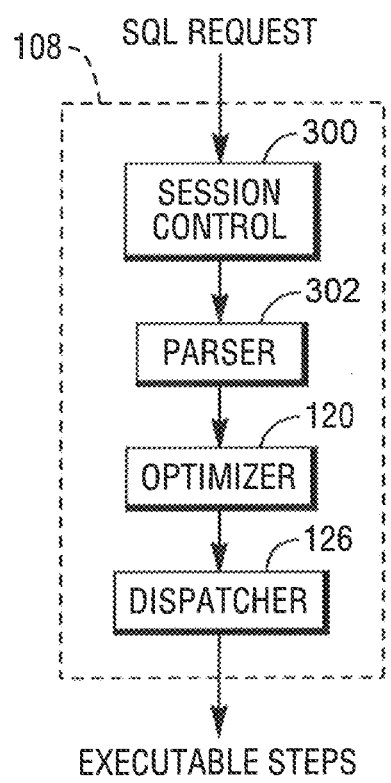
FIG. 3 is a block diagram of a portion of the example database system of FIG. 1.

In one example system, each parsing engine module 108 includes three primary components: a session control module 300, a parser module 302, and a dispatcher module 126 as shown in FIG. 3. The session control module 300 provides the logon and logoff functions. It accepts a request for authorization to access the database, verifies it, and then either allows or disallows the access. Once the session control module 300 allows a session to begin, an SQL request may be received such as through submission by a user and the SQL request is routed to the parser module 302.

Figure 4:
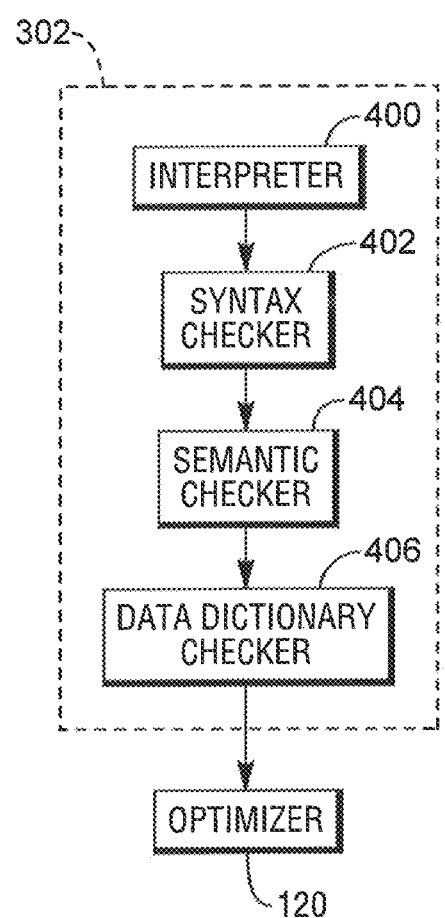
FIG. 4 is a block diagram of another portion of the example database system of FIG. 1.

As illustrated in FIG. 4, the parser module 302 may include an interpreter module 400 that interprets the SQL request. The parser module 302 may also include a syntax checker module 402 that checks the request for correct SQL syntax, as well as a semantic checker module 404 that evaluates the request semantically. The parser module 302 may additionally include a data dictionary checker 406 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

As stated earlier, the present invention is directed to an improved spool table structure compatible with in-memory processing for increasing cache efficiency during hash join processing. A hash join is one of the plans suggested by the optimizer module based on joining conditions. Hash Join gets its name from the fact that one smaller table is built as a "hash-table", and potential matching rows from the second table are searched by hashing against the smaller table. Typically, the optimizer module will first identify a smaller table, and then sort it by the join column row hash sequence. If the smaller table can fit entirely in memory, the performance will be best. The larger table is processed one row at a time by doing a binary search of the smaller table for a match.

Figure 5:
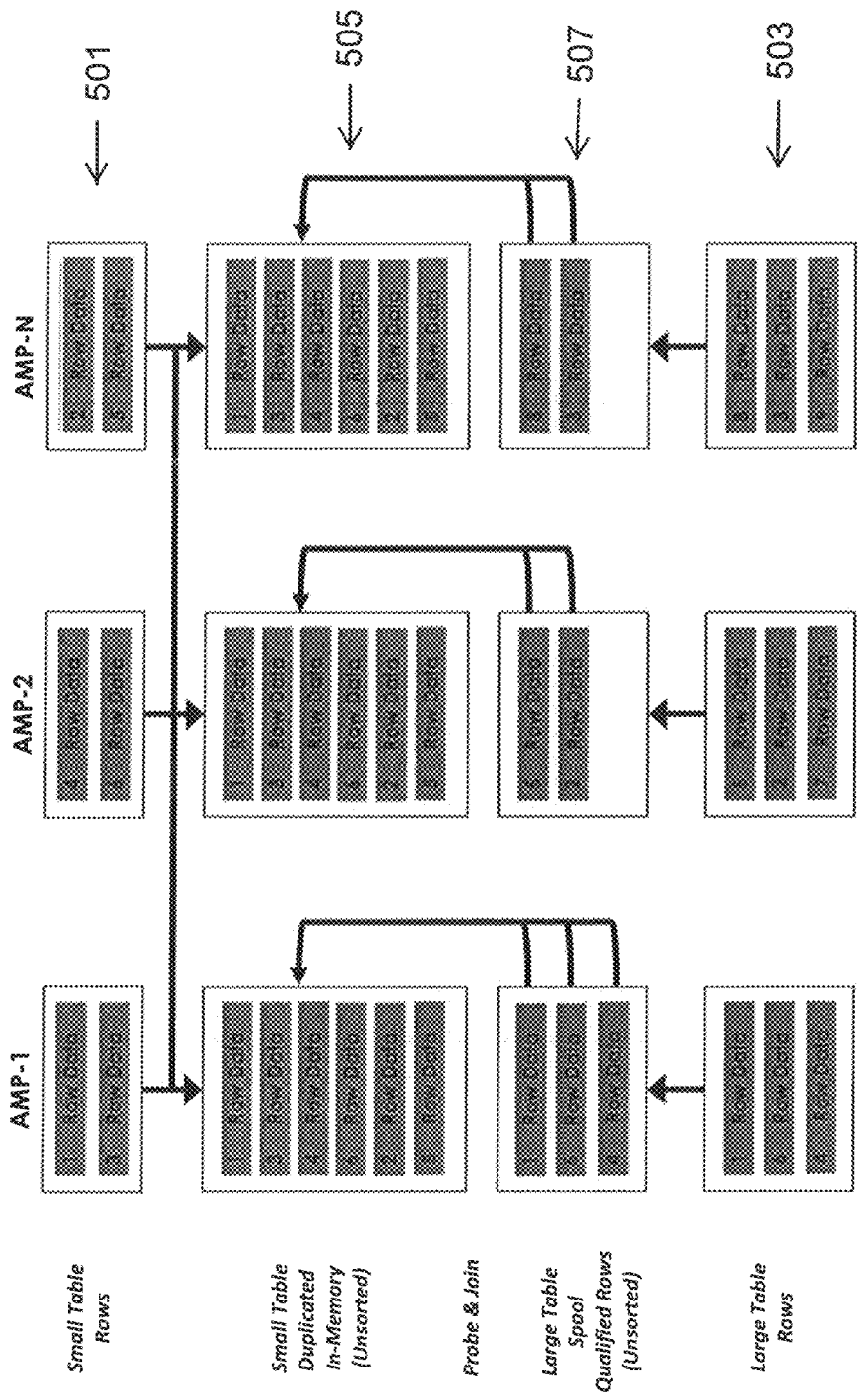
FIG. 5 provides an illustration of a classic hash join operation for joining a small and large table.

FIG. 5 provides an illustration, of a classic hash join operation for joining a small and large table. A hash join leverages memory and typically gets chosen by the optimizer module when joining a small table with a very large table using an Inner Join. In the example illustrated in FIG. 5, a small table 501 is shown at the top of the illustration with six rows spread across three AMPs, and a large table 503 is shown at the bottom with nine rows, again spread across the three AMPs. Obviously in a real-world environment, the number of rows for both tables would be much greater, but one requirement for using a hash join is that the small table must fit entirely in memory.

In preparation for the hash join the entire small table 505 is duplicated to memory on each one of the AMPs, e.g. AMP-1, AMP-2 through AMP-N. Each AMP contains the entire small table in memory. The large table is read and all qualifying rows are written into a spool file 507. Spool file 507 is distributed across the three AMPs.

On each AMP, the Hash Join algorithm will examine the corresponding rows in the large spool file 507, and for a row at a time will probe the small table, which sits in memory 505, for join partners. If there are join partners the rows will be written out to another spool file.

Figure 6:
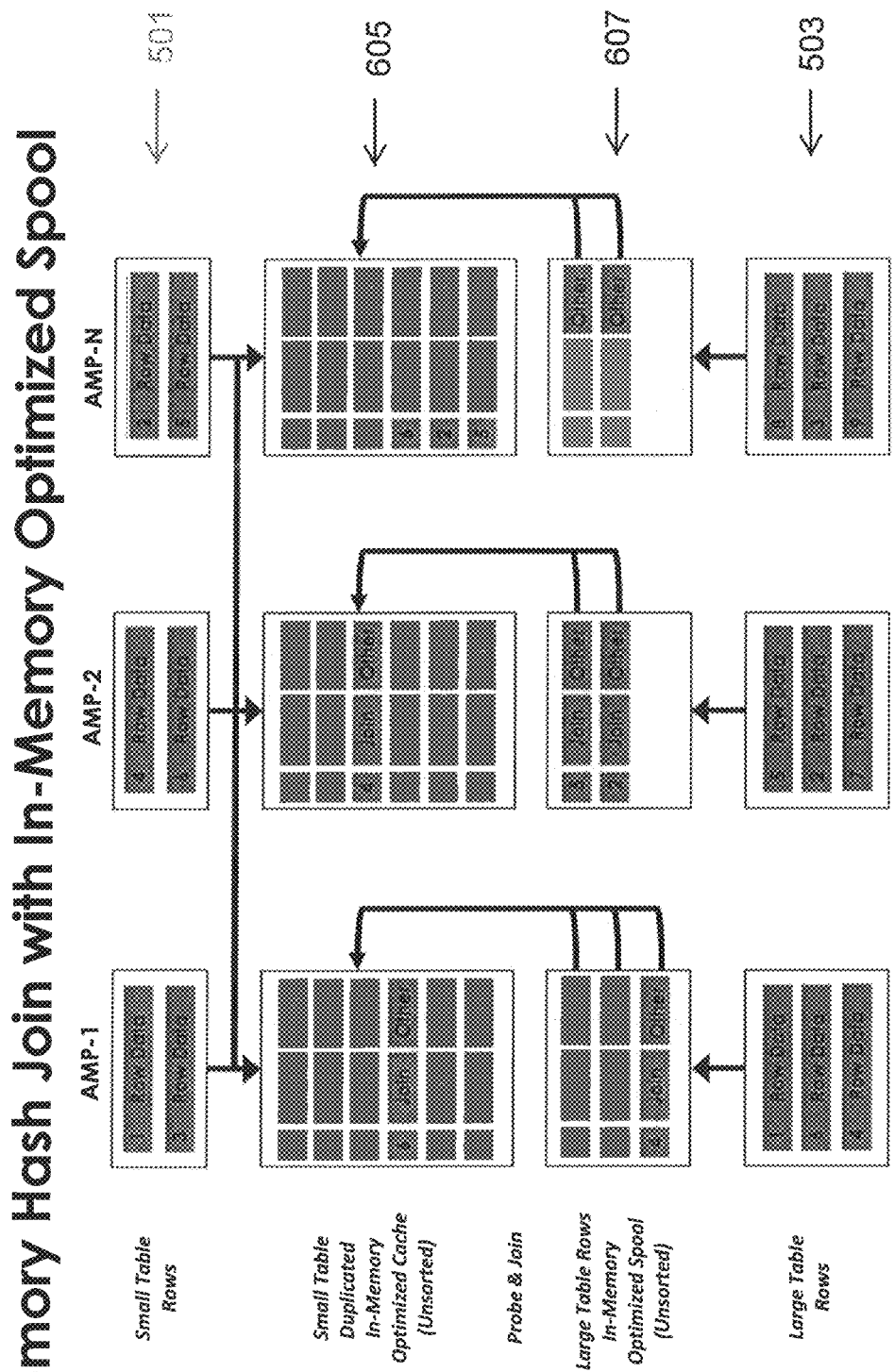
FIG. 6 provides an illustration of an optimized, in-memory, hash join operation for joining a small and large table.

FIG. 6 provides an illustration of an optimized, in-memory, hash join operation for joining small table 501 and large table 503. The entire small table 605 is duplicated to memory on each AMP, and the large table is read and all qualifying rows are written into a spool file 607. However, the in-memory small table 605, and the large table spool file 607 are structured in a different manner than shown in the classic hash join illustrated in FIG. 5, discussed above. The in-memory small table 605, and the large table spool file 607 are no longer comprised of full table rows, but are organized in a cache friendly structure with each comprised of a subset of table columns organized in three columnar containers. The first container holds a primary index, the second container holds the column(s) to be joined on, and the third container holds other data needed from the table to create the answer set. The join will then be performed against these cache friendly structures.

Please note that this feature is engaged when the optimizer module determines it is cheaper than other join techniques, including the classical hash join technique illustrated in FIG. 5, based on data demographics and a cost profile for a given configuration. This feature may be utilized with row-based as well as column-based tables.

Performance of any operation including joins improves when cache efficiency improves. Cache efficiency improves when items within the cache are accessed sequentially. There are two ways to achieve this locality of reference: 1) organize the hash structure data in a predictable manner such that the CPU or software prefetching logic can easily predict and preload the data that is needed next by the CPU, and 2) reduce the data foot print and keep more useful data in each cache line.

Typically spools are produced as row formatted spools. They are not produced with an understanding of how they are going to be consumed by a join processor. Producing a spool that is aware of how it is going to be consumed by join processing helps to improve memory bandwidth and cache efficiency. One way to produce such a spool is to partition it as per the consumption pattern.

To help improve join processing, the join condition and projection columns are analyzed and results split into three parts. The first part is the best selective fixed length bind term that is suitable for vector execution. The second part consists of all fixed length column bind terms. The third part consists of all variable length column bind terms, residual term column and projection columns. This is the format the In Memory optimized spool follows when in disk and this format is followed when staged in DRAM. Specifically, the in memory optimized spool format is as follows:

A partition with the hash value of all the bind terms. If the spool is for the inner table these hash values are used for building the hash table, and if the spool is for the outer table then these values are used for probing into the hash table;

A partition for the join column with the best selectivity used in a bind term that is fixed length;

A partition for all the fixed length columns used in bind terms; and

A partition for all the variable length columns used in bind terms, residual join condition columns and all the projected columns.

This organization for an in-memory optimized spool improves cache payload efficiency, enables SIMD processing since data is co-located, and increases memory (DRAM) bandwidth.

The best selective partition helps in filtering the most number of rows. It also helps in improving cache efficiency since these partition values are arranged together hence improving the data locality and in-turn help improving cache efficiency. This helps in pipelined (assembly line) manner of join processing, i.e., a set of rows from best selective partition are evaluated first and the result is used to read and evaluate the other partitions including the fixed length partition. This execution model makes sure data is accessed sequentially in an array like access hence improving the cache efficiency. This organization of best selective partitions enables loading of multiple values into processor cache with a single instruction and ensures all the loaded values are used. The best selective partition organization enables evaluating multiple data values using SIMD instruction. Separating best selective and fixed length terms in different partitions also helps in improving cache efficiency since it avoids extra columns which may not be accessed if the selectivity is very high.

Figure 7:
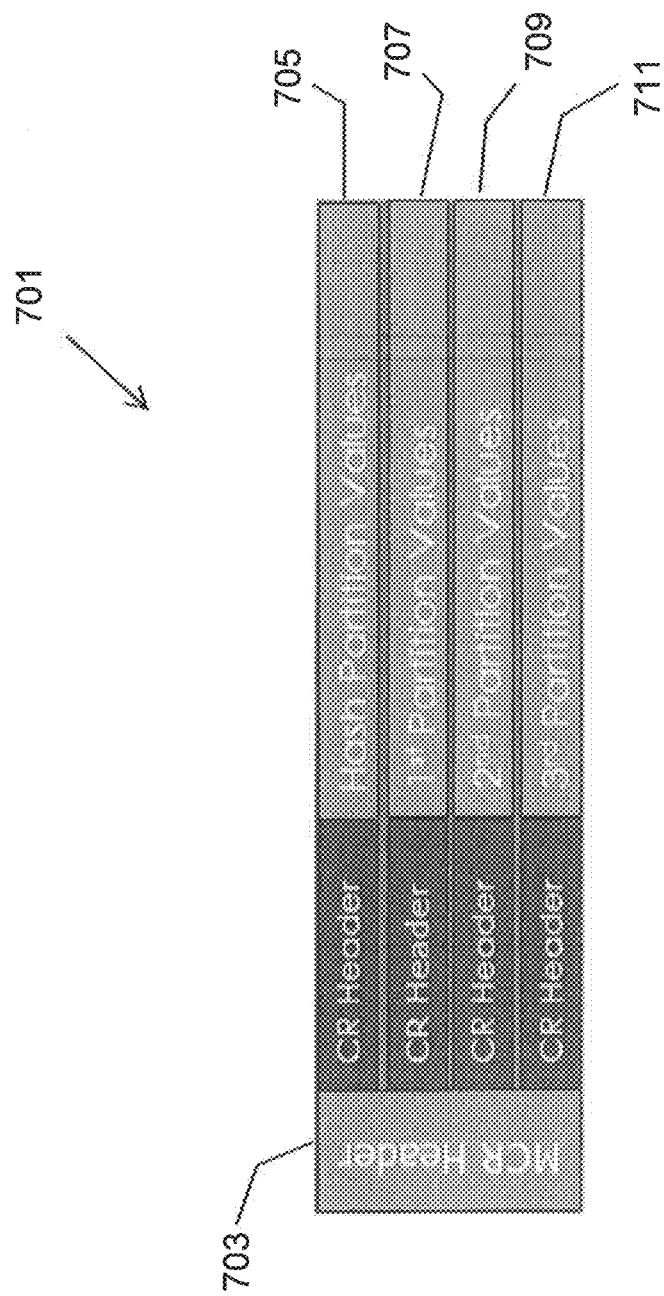
FIG. 7 provides an illustration of a mini-container row (MCR) for a spool file, including partitions for hash values, join condition columns, and projected columns, in accordance with the present invention.
Figure 8:
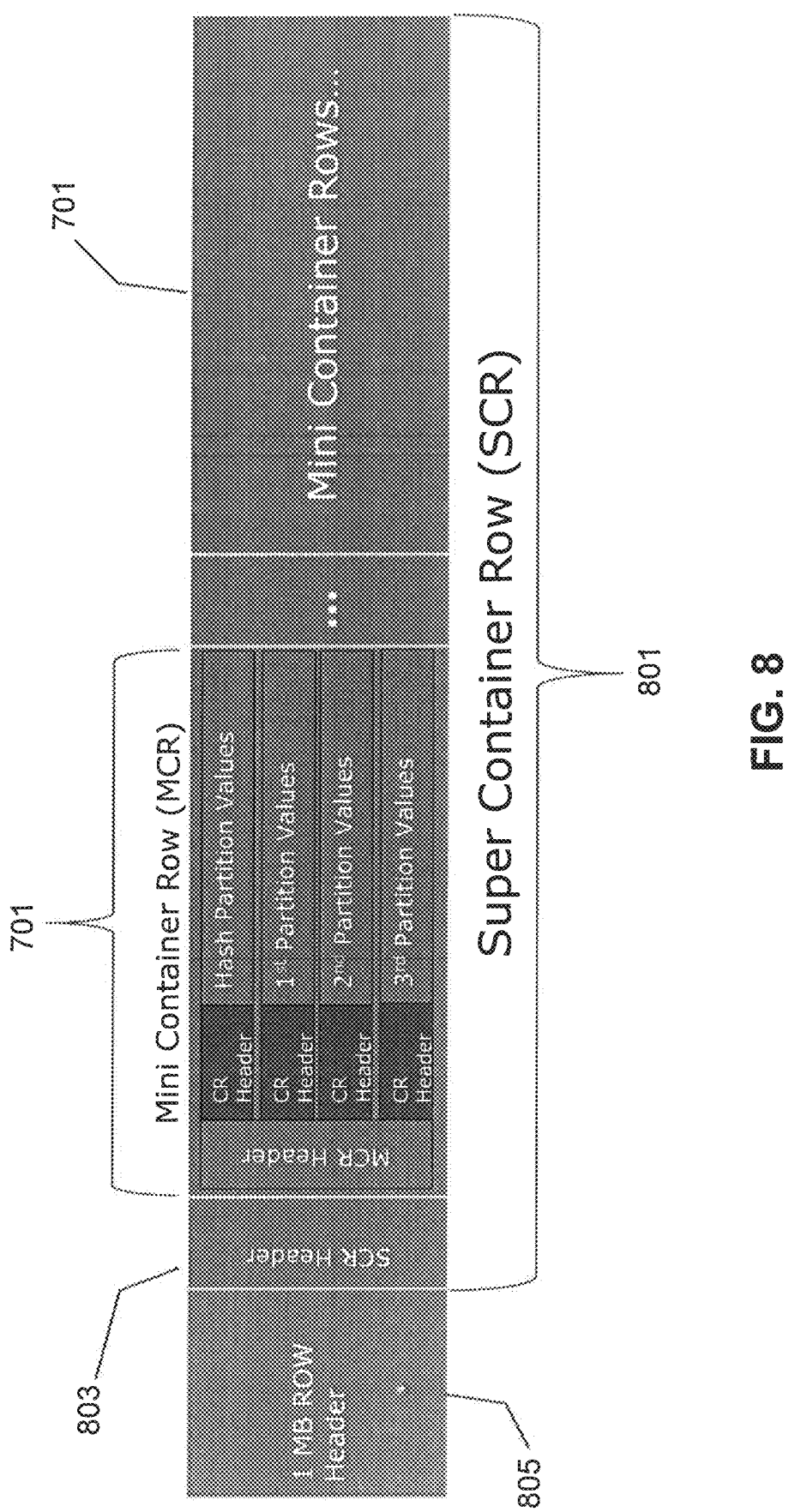
FIG. 8 provides an illustration of a super-container row (SCR) including multiple mini-container rows, in accordance with the present invention.

The format of the in-memory optimized spool is similar to columnar format with some enhancements. However, the process of building a columnar spool having multiple column partitions is resource intensive in CPU path versus single column partition creation. The process is also intensive in IO, since for every IO of a regular spool, as many IOs as there are column partitions must be written for a columnar spool. FIGS. 7 and 8 illustrate a spool row structure implemented to reduce CPU path and IO path usage.

The in-memory optimized spool has a fixed number of column partitions and they are multicolumn partitions, but how the partitions are stored in the file system has been modified. In-Memory optimized spool storage in the file system is different from columnar table container rows (CR). Container rows for all the partitions are bundled together into a structure called a mini container row (MCR), shown in FIG. 7. Referring to FIG. 7, a MCR 701 comprises an MCR header 703, a partition 705 with the hash value of all the bind terms, a partition 707 for the join column with the best selectivity used in a bind term that is fixed length; a partition 709 for all the fixed length columns used in bind terms; and a partition 711 for all the variable length columns used in bind terms, residual join condition columns and all the projected columns.

The size of each partition in the MCR is 2K. The maximum size of the MCR is 8K, which allows the whole MCR block to stay in either a L2 or L3 cache. MCR organization, its size and process of appending partition values is done such that it provides better cache efficiency. Partition values are appended. Therefore, first level cache hits are high for appending to each partition.

This organization of MCR provides in better cache efficiency during MCR write as well as during MCR read.

Within the optimized columnar spool, a container row consists of multiple MCRs. This container row of MCRs is referred to as a super container row (SCR). FIG. 8 provides an illustration of a super container row (SCR) 801 including a SCR header 803 and multiple MCRs 701, each with four CRs.

The MCR is written as a single entity. Each of the four partitions in the MCR are not written individually. This means a single IO of 8K is performed during the write, instead of four IOs of 2K each for writing each of the four partitions.

This organization of MCR makes it possible to append rows while building in-memory spools. This capability to append rows avoids performance penalties associated with partitions during the columnar spool creation, Improves memory bandwidth as data is co-located for processing, and Enables SIMD processing through intelligent reorganization of spool data and thereby helps improve CPI.

The in-memory optimized spool provides the benefits of a row format spool during spool creation and the benefits of column format during spool consumption, i.e., read and process.

What is claimed is:

1. A method for spooling data for use in joining a small table with a large table in a relational database system, said method comprising the steps of:
    analyzing a join condition for combining records from said small and large tables and selecting qualified rows from said large table; and
    writing said qualified rows to a spool file, said spool file including:
        a first partition containing hash values of all bind terms for said join condition;
        a second partition including a join column with a best selective bind term; and
        at least one additional partition including additional join columns used in bind terms.

2. The method for spooling data for use in joining a small table with a large table in a relational database system in accordance with claim 1, wherein:
    said join column within said second partition has a fixed length;
    said at least one additional partition comprises
    a third partition including fixed length join columns used in bind terms; and
    a fourth partition including variable length join columns used in bind terms.

3. The method for spooling data for use in joining a small table with a large table in a relational database system in accordance with claim 1, wherein:
    said partitions are grouped together within a container row in said spool file.

4. The method for spooling data for use in joining a small table with a large table in a relational database system in accordance with claim 3, wherein:
    multiple container rows are written together within a super-container row in said spool file.

5. The method for spooling data for use in joining a small table with a large table in a relational database system in accordance with claim 1, wherein:
    said spool file is written into a processor memory.

6. In a relational database system, a spool file contained in processor memory for use in joining a small table with a large table, said spool file comprising:
    a super-container row comprising multiple mini-container rows;
    each one of said mini-container rows comprising multiple container partitions;
    said multiple container partitions including join columns and hash values for use in performing a table join operation.

* * * * *